May 10, 1966         G. MEHWALD         3,251,006
CONTROLLED RECTIFIER INVERTER
Filed Dec. 23, 1963
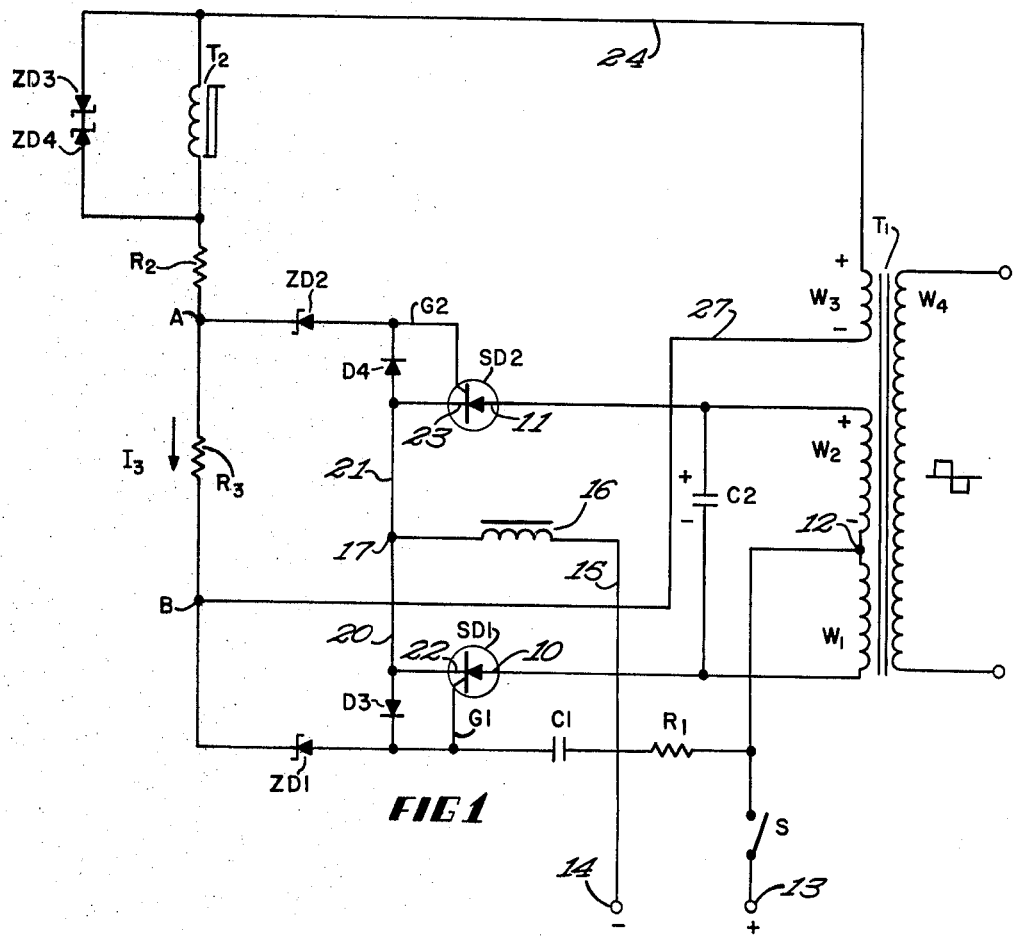
FIG 1
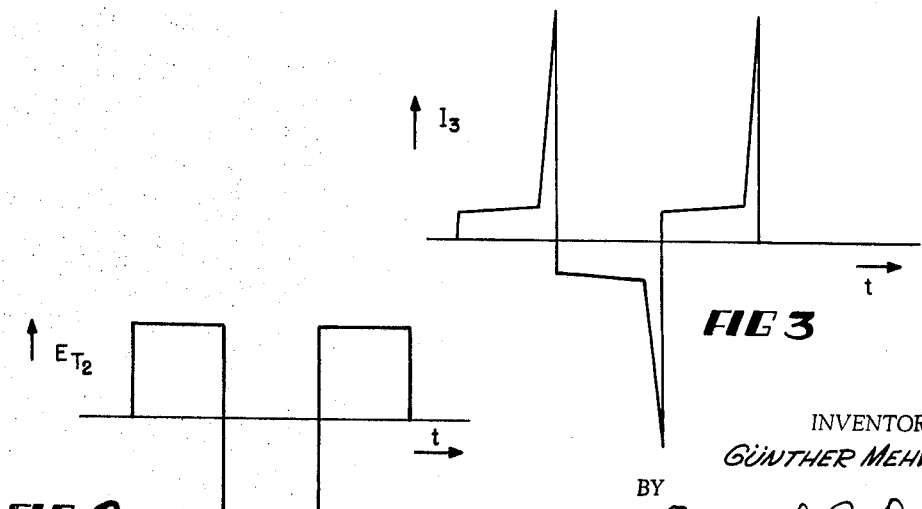
FIG 2
FIG 3
INVENTOR.
GÜNTHER MEHWALD
BY Osmund R. Dahle
ATTORNEY

United States Patent Office 3,251,006
Patented May 10, 1966

3,251,006
CONTROLLED RECTIFIER INVERTER
Günther Mehwald, Hanau am Main, Germany, assignor to Honeywell G.m.b.H., Frankfurt am Main, Germany, a corporation of Germany
Filed Dec. 23, 1963, Ser. No. 332,387
Claims priority, application Germany, Jan. 9, 1963, H 47,909
8 Claims. (Cl. 331—113)

This application relates to a self-oscillating inverter circuit using semiconductor controlled rectifiers. In the field of low voltage direct current to higher voltage alternating current inverters, it is well known to use a self-oscillating inverter circuit with two transistors operating on push-pull conditions and having an output transformer including a primary winding, a secondary winding, and a feedback winding. Insofar as these inverters are only used for voltage transformation, for instance in flashlight apparatus, no special claims with respect to the shape of the output voltage wave form are made. If, however, a higher power is to be obtained from such an inverter circuit, it is desirable to have a substantially square shaped output voltage wave form in order to have a good efficiency in the inverter circuit. In addition, when such an inverter circuit is used for measuring, control or switching purposes, a substantially square shaped output voltage is preferred. In order to obtain such a voltage wave form, it is necessary that the amplifier elements be switched from the conducting condition into the blocked or nonconducting condition, and vice versa, in as short a time as possible. This can be accomplished by using semiconductor controlled rectifiers developed especially for such purposes, in a better manner than with conventional transistors. Such semiconductor controlled rectifiers are also called "four-layer triodes," "four-layer diodes," or "switch transistors." The uniqueness of such semiconductor controlled rectifiers in comparison to transistors is that they cannot be switched off by varying the control current through the control electrode and the cathode but that a decrease of the voltage between anode and cathode is necessary to extinguish current flow through the controlled rectifier.

The invention concerns an inverter circuit which uses such semiconductor controlled rectifiers, preferably silicon controlled rectifiers and operates in a self-oscillating mode without an additional source of trigger pulses. According to the present invention, the trigger impulses for the semi-conductor controlled rectifiers are created by a magnetic pulse generator which is connected to the feedback winding of the transformer. According to a preferred embodiment of this invention, a magnetic device which includes a core exhibiting substantially square hysteresis loop characteristics is connected in series with a resistance to the feedback winding, and the voltage across the resistance is effective to switch on the nonconductive controlled rectifier as the voltage at that resistance increases above the inverse voltage of a reference Zener diode. When this increased voltage appears, current is caused to flow through the control circuit, from control electrode to cathode of the controlled rectifier. When the above mentioned controlled rectifier is switched on, one plate of a capacitor which is connected in parallel to the primary winding of the transformer is connected to the cathode of the controlled rectifier. The electric charge of the capacitor increases the cathode voltage of the other controlled rectifier over the anode voltage so that the controlled rectifier is blocked.

In order to stabilize the frequency of the generated square wave oscillations, the voltage limiting arrangement of Zener diodes is connected in parallel to the saturable coil having the substantially square hysteresis loop. The effects of this limitation of voltage will be discussed in better detail below.

It is an object of this invention, therefore, to provide an inverter circuit which uses semiconductor controlled rectifiers and operates in a free running self-oscillating mode without an additional source of trigger impulses.

Another object of the invention is to provide in such an inverter circuit a magnetic pulse generator for producing the trigger pulses to the semiconductor rectifiers.

A more specific object of the invention is to provide an inverter according to the above mentioned objects in which the magnetic pulse generator is in the nature of a saturable coil connected in series with a resistance and energized from the feedback winding of the inverter oscillator.

These and other objects of the invention will become more apparent upon a consideration of the attached claims, specification, and drawing of which:

FIGURE 1 is a circuit diagram of the inverter;
FIGURE 2 shows the wave form of the voltage across the saturable coil, which coil has a substantially square shaped hysteresis loop; and,
FIGURE 3 shows the wave form of the current flowing through the resistance connected in series with the saturable coil.

Turning now to the drawings and particularly to FIGURE 1, the anodes 10 and 11 of silicon controlled rectifiers SD1 and SD2 are connected to opposite terminals of the center tapped primary winding W1–W2 of the inverter output transformer T1. The center tap 12 of the primary winding is connected by means of a switch S to one terminal 13 of a D.C. source, not shown. From the other terminal 14 of the source, a conductive path may be traced through a conductor 15, an inductance coil 16, a junction 17, and conductors 20 and 21, respectively, to the cathodes 22 and 23 of the two controlled rectifiers SD1 and SD2. A commutating capacitor C2 directly connects together the anodes 10 and 11 of the two rectifiers which delivers the voltage for blocking and turning off the controlled rectifier which was currently conducting. A rectifying diode D3 is directly connected between the control electrode G1 and the cathode 22 of the controlled rectifier D1. The diode D3 is connected to provide a current path in the opposite direction of current flowing through the control circuit of the controlled rectifier SD1 from control electrode G1 to cathode 22. Similarly, a diode D4 is directly connected between the control electrode G2 and the cathode 23 of the controlled rectifier SD2. The diode D4 is connected in a polarity direction such that it provides a current path in the opposite direction to the current which flows through the control circuit of SD2 from control electrode G2 to cathode 23. It may thus be seen that a control current flowing through the control circuit of controlled rectifier SD2 also flows through the diode D3 and that the control current flowing through the control circuit of controlled rectifier SD1 also flows through rectifying diode D4.

A saturable inductance T2 having substantially square shaped hysteresis loop characteristics is connected to a feedback winding W3 of the transformer T1. Connected in series with the inductance T2 are a pair of resistors R2 and R3. A current path may be traced from the upper terminal of winding W3 through a conductor 24, the winding of inductance T2, the resistor R2, a junction A, the resistor R3, a junction B, and through a conductor 27 to the lower terminal of feedback winding W3. The upper terminal of the resistance R3 is connected through the junction A and a voltage reference shown as a Zener diode ZD2 to the control electrode G2 of the controlled rectifier SD2. The lower terminal B of the resistance R3 is connected through a second Zener diode ZD1 to the control electrode G1 of the controlled rectifier SD1. Both silicon controlled rectifiers are controlled by the voltage appearing across the resistance R3. A pair of Zener diodes ZD3 and ZD4 are connected in series and in polarity opposition one to the other, the two diodes being connected in parallel with the inductance coil T2.

Turning now to a consideration of the operation of the circuit, when switch S is closed, a positive trigger pulse appears through starting circuit comprising resistor R1 and capacitor C1 to the control electrode G1 of the controlled rectifier SD1. This trigger pulse turns on the controlled rectifier SD1 whereby the lower half W1 of the primary winding of transformer T1 is connected to and energized by the D.C. source and a current path may be traced from the positive source terminal 13 to the switch S, the lower portion of the primary winding, through the controlled rectifier from anode 10 to cathode 22, through conductor 20, inductance 16, and conductor 15 to the negative source terminal 14. The result is that in the upper half of the primary winding W2 and in the feedback winding W3, voltages are induced with a polarity as shown in FIGURE 1. As the number of windings on coil portions W1 and W2 of the primary winding are equal, the capacitor C2 is charged to approximately twice the value of the D.C. source voltage. The voltage induced in the feedback winding W3 at the same time is supplied to the series connection of the inductance T2 and the two resistors R2 and R3. When the current flowing through the inductance T2 causes saturation of the core, the voltage across the inductance T2 is substantially reduced with the result that the voltage appearing across the resistance R3 is increased accordingly. The elements of the circuit are selected in such a manner that the voltage appearing across the resistance R3 temporarily becomes higher than the Zener break-down point of the Zener diode ZD2 when the inductance T2 reaches the saturated condition. Zener diode ZD2 becomes conductive and current then flows from junction A through the Zener diode ZD2, control electrode and cathode of controlled rectifier SD2, diode D3, and in the forward direction through the other Zener diode ZD1 to junction B, the current being effective to switch on the rectifier SD2. As controlled rectifier SD2 is switched to its conductive condition, the potential at the upper electrode of commutating capacitor C2 approaches the potential at the cathode of controlled rectifier SD2 and since the commutating capacitor has a charge thereacross which is approximately twice the supply voltage, the anode 10 of SD1 is momentarily back biased with respect to its cathode 22 to switch off this controlled rectifier SD1. The current now flows from the source terminal 13 through the switch S, the winding W2, the controlled rectifier SD2, and the conductance coil 16 to the negative terminal 14 of the source. All voltages across the transformer windings and in the connected circuits are reversed in polarity. When the core of the inductance T2 becomes saturated in the opposite direction, it is apparent that again the voltage across the inductance T2 is sharply reduced and the voltage across resistor R3 is increased. As the voltages are now of an opposite polarity, the Zener break-down point of the Zener diode ZD1 is exceeded by the potential across resistor R3 and the controlled rectifier SD1 is switched on. In the switching operation, current flows from the junction B through the Zener diode ZD1, control electrode G1 and cathode 22 of controlled rectifier SD1, the diode D4 which is conducting in its forward direction, and through the Zener diode ZD2 in its forward direction, to junction A. By switching on the lower controlled rectifier SD1, the second half cycle of the oscillation is started.

The generated square wave oscillations are available for use at the secondary winding W4 of the transformer T1. The frequency is in accordance with the following equation:

$$f = \frac{E_{T2}}{4w_{T2} \cdot B_s \cdot q_{fe}}$$

In the above equation:

$E_{T2}$ = the voltage across T2 (peak voltage) in volts
$B_s$ = saturation inductance in Gauss
$q_{fe}$ = dimensions of the core (cross section) in cm².
$f$ = frequency in c.p.s.
$w_{T2}$ = number of windings of T2

This equation shows that the frequency $f$ is proportional to the voltage $E_{T2}$ across the saturable coil T2. The Zener diode arrangement ZD3 and ZD4 in parallel with the coil T2 is utilized in order to maintain the voltage across the coil T2 constant. The Zener diode arrangement shown in parallel with T2 comprises two series connected Zener diodes ZD3 and ZD4 connected in opposite directions. This arrangement effects the frequency stabilization of the oscillator inverter even when the supply voltage is varying.

Referring now to the curve of the voltage $E_{T2}$ appearing across the inductance coil T2 as shown in FIGURE 2, taken together with consideration of the current flowing through the resistance R3 as shown in FIGURE 3, it may be noted that this current consists of two components. The first portion of the current wave form is determined by the current flowing through the Zener diode arrangement ZD3 and ZD4. The other component is the current of time-related increase flowing through the inductance coil T2. When the coil of the inductance reaches saturation, the current flowing through the inductance coil T2 and through the resistance R3 increases rapidly. The result of this is that the voltage across resistance R3 also increases rapidly as shown by the spike in FIGURE 3 and the controlled rectifier SD2 is switched on as referred to above. As the wave forms of FIGURE 2 and FIGURE 3 show, the voltage across the inductance T2 as well as the current flowing through the resistance R3 reverse in direction each time switching occurs.

Modifications of this invention may be apparent to those who are versed in the art and I therefore wish it to be understood that I intend to be limited to the scope of the appended claims and not to the specific embodiment of my invention which is disclosed for the purpose of illustration.

I claim as my invention:

1. Self-oscillating inverter apparatus for inverting a source of direct current potential to an alternating type potential comprising:
   a pair of semiconductor controlled rectifiers connected to operate in a push-pull type manner;
   output transformer means having a plurality of windings including a feedback winding, said controlled rectifiers connected in push-pull through the primary winding of said output transformer means;
   magnetic pulse generating means;
   resistive means;

first and second Zener diodes connected respectively from the control electrodes of said pair of controlled rectifiers to said resistive means;

and connective means connecting said resistive means in series with said magnetic pulse generating means and further connecting said feedback winding to said resistive and magnetic means in energizing relation thereto, so that trigger pulses for the controlled rectifiers are created by means of said magnetic pulse generating means which is fed from the feedback winding of the transformer.

2. Self-oscillating inverter apparatus for inverting a source of direct current potential to an alternating type potential comprising:

a pair of semiconductor controlled rectifiers connected to operate in a push-pull type manner;

output transformer means having a plurality of windings including a feedback winding, said controlled rectifiers connected in push-pull through the primary winding of said output transformer means;

saturable inductive means;

resistive means;

first and second Zener diodes connected respectively from the control electrodes of said pair of controlled rectifiers to said resistive means;

and connective means connecting said resistive means in series with said saturable inductive means and further connecting said feedback winding to said resistive and inductive means in energizing relation thereto, so that trigger pulses for the controlled rectifiers are generated by means of saturation of the said saturable inductive means which is energized from the feedback winding of the transformer.

3. Inverter apparatus according to claim 2 in which the saturable inductance means has a substantially square shaped hysteresis loop.

4. Inverter apparatus according to claim 2 in which the voltage across the resistive means exceeds the reverse voltage of the Zener diodes upon the occurrence of saturation in said inductance means whereby the switching pulse for said controlled rectifier passes through said Zener diodes.

5. Self-oscillating inverter apparatus for inverting a source of direct current potential to an alternating type potential comprising:

a pair of semiconductor controlled rectifiers connected to operate in a push-pull type manner, each having a control electrode, a cathode and an anode;

output transformer means having a plurality of windings including a center tapped primary winding and a feedback winding, said controlled rectifiers connected in push-pull through said primary winding;

saturable inductance means;

resistive means;

first and second Zener diodes connected respectively from said control electrodes of said pair of controlled rectifiers to opposite terminals of said resistive means;

means connecting said resistive means in series with said saturable inductive means;

further connective means connecting said feedback winding to said resistive and inductive means in energizing relation thereto, so that trigger pulses for the controlled rectifiers are created by means of flux saturation of said saturable inductance means which is fed from the feedback winding of the transformer;

and commutating capacitor means connected between said two anodes and thus being connected across said primary winding for switching off alternately the one and the other semiconductor controlled rectifier.

6. Self-oscillating inverter apparatus for inverting a source of direct current potential to an alternating type potential comprising:

a pair of semiconductor controlled rectifiers connected to operate in a push-pull type manner, each having a control electrode, a cathode and an anode;

output transformer means having a plurality of windings including a center tapped primary winding and a feedback winding, said controlled rectifiers connected in push-pull through said primary winding;

saturable inductance means;

resistive means;

first and second Zener diodes connected respectively from said control electrodes of said pair of controlled rectifiers to opposite terminals of said resistive means;

means connecting said resistive means in series with said saturable inductive means;

further connective means connecting said feedback winding to said resistive and inductive means in energizing relation thereto, so that trigger pulses for the controlled rectifiers are created by means of flux saturation of said saturable inductance means which is fed from the feedback winding of the transformer;

and first and second rectifying diodes connected between the control electrode and cathode of each controlled rectifier in a polarity direction opposite to the forward direction of the cathode-control junction.

7. Self-oscillating inverter apparatus for inverting a source of direct current potential to an alternating type potential comprising:

a pair of semiconductor controlled rectifiers connected to operate in a push-pull type manner, each having a control electrode, a cathode and an anode;

output transformer means having a plurality of windings including a center tapped primary winding and a feedback winding, said controlled rectifiers connected in push-pull through said primary winding;

saturable inductance means;

resistive means;

first and second Zener diodes connected respectively from said control electrodes of said pair of controlled rectifiers to opposite terminals of said resistive means;

means connecting said resistive means in series with said saturable inductive means;

further connective means connecting said feedback winding to said resistive and inductive means in energizing relation thereto, so that trigger pulses for the controlled rectifiers are created by means of flux saturation of said saturable inductance means which is fed from the feedback winding of the transformer;

first and second rectifying diodes connected between the control electrode and cathode of each controlled rectifier in a polarity direction opposite to the forward direction of the cathode-control junction;

and voltage limiting means connected across said saturable inductance means.

8. Self-oscillating inverter apparatus for inverting a source of direct current potential to an alternating type potential comprising:

a pair of semiconductor controlled rectifiers connected to operate in a push-pull type manner, each having a control electrode, a cathode and an anode;

output transformer means having a plurality of windings including a center tapped primary winding and a feedback winding, said controlled rectifiers connected in push-pull through said primary winding;

saturable inductance means;

resistive means;

first and second Zener diodes connected respectively from said control electrodes of said pair of controlled rectifiers to opposite terminals of said resistive means;

means connecting said resistive means in series with said saturable inductive means;

further connective means connecting said feedback winding to said resistive and inductive means in energizing relation thereto, so that trigger pulses for the controlled rectifiers are created by means of flux saturation of said saturable inductance means which is fed from the feedback winding of the transformer;
first and second rectifying diodes connected between the control electrode and cathode of each controlled rectifier in a polarity direction opposite to the forward direction of the cathode-control junction;
voltage limiting means connected across said saturable inductance means;
and commutating capacitor means connected between said two anodes and thus being connected across said primary winding for switching off alternately the one and the other semiconductor controlled rectifier.

No references cited.

NATHAN KAUFMAN, *Acting Primary Examiner.*
ROY LAKE, *Examiner.*
S. H. GRIMM, *Assistant Examiner.*